US012509857B2

(12) United States Patent
Ruemelin et al.

(10) Patent No.: US 12,509,857 B2
(45) Date of Patent: Dec. 30, 2025

(54) ENERGY RECOVERY PREVENTION FOR A HYDRAULIC SYSTEM

(71) Applicant: Caterpillar Inc., Peoria, IL (US)

(72) Inventors: Christopher M. Ruemelin, Morton, IL (US); Adam M. Nackers, Washington, IL (US); Matthew Mason, Peoria, IL (US); Cole Hunt, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/744,872

(22) Filed: Jun. 17, 2024

(65) Prior Publication Data

US 2025/0382771 A1 Dec. 18, 2025

(51) Int. Cl.

| | |
|---|---|
| ***E02F 9/22*** | (2006.01) |
| ***F15B 11/17*** | (2006.01) |
| ***F15B 21/14*** | (2006.01) |

(52) U.S. Cl.

CPC .......... *E02F 9/2217* (2013.01); *E02F 9/2246* (2013.01); *F15B 11/17* (2013.01); *F15B 21/14* (2013.01); *F15B 2211/20515* (2013.01); *F15B 2211/45* (2013.01)

(58) Field of Classification Search

CPC .... F15B 21/14; F15B 11/0423; F15B 11/055; F15B 11/165; F15B 11/17; F15B 2211/20515; F15B 2211/45; E02F 9/2217

See application file for complete search history.

(56) References Cited

U.S. PATENT DOCUMENTS

| | | | | |
|---|---|---|---|---|
| 5,251,442 A * | 10/1993 | Roche | F16H 61/448 60/368 |
| 5,649,422 A * | 7/1997 | Baginski | F15B 21/14 60/431 |
| 7,525,206 B2 | 4/2009 | Kagoshima et al. | |
| 7,734,401 B2 | 6/2010 | Joe et al. | |
| 8,997,476 B2 | 4/2015 | Brinkman et al. | |

(Continued)

FOREIGN PATENT DOCUMENTS

| | | |
|---|---|---|
| DE | 102015111926 A1 | 1/2017 |
| EP | 3978691 A1 | 4/2022 |

(Continued)

OTHER PUBLICATIONS

Written Opinion and International Search Report for Int'l. Patent Appln. No. PCT/US2025/032359, mailed Oct. 16, 2025 (14 pgs).

*Primary Examiner* — Michael Leslie

(57) ABSTRACT

A hydraulic system may include an electric motor and a power source electrically coupled to the electric motor. During operation of the hydraulic system in an energy recovery mode, a net negative torque may be applied to the electric motor causing the electric motor to convert a mechanical power output to an electrical input and provide the electrical input to the power source. The hydraulic system may include a controller configured to determine a time that the hydraulic system operates in the energy recovery mode and cause, during the time that the hydraulic system operates in the energy recovery mode, application of an energy recovery prevention torque to the hydraulic system. The energy recovery prevention torque may prevent the electric motor from converting the mechanical power output to the electrical input and providing the electrical input to the power source.

18 Claims, 6 Drawing Sheets

(56) References Cited

U.S. PATENT DOCUMENTS

| | | | | |
|---|---|---|---|---|
| 9,243,384 | B2 | 1/2016 | Yamashita et al. | |
| 9,547,286 | B2 | 1/2017 | Miyakawa et al. | |
| 9,598,842 | B2 * | 3/2017 | Imura | E02F 9/2075 |
| 9,809,957 | B2 * | 11/2017 | Rösth | E02F 9/2296 |
| 11,198,987 | B2 * | 12/2021 | Metzger | E02F 9/2296 |
| 11,377,814 | B2 * | 7/2022 | Kim | E02F 9/2217 |
| 11,441,585 | B2 * | 9/2022 | Buscicchio | F15B 21/14 |
| 11,542,683 | B2 * | 1/2023 | Kang | E02F 9/2217 |
| 11,885,105 | B2 * | 1/2024 | Nagai | E02F 9/2296 |
| 2013/0013159 | A1 * | 1/2013 | Moriki | B66F 9/22<br>701/50 |
| 2019/0277311 | A1 * | 9/2019 | Verho | E02F 9/2292 |
| 2021/0372078 | A1 | 12/2021 | Kim | |

FOREIGN PATENT DOCUMENTS

| | | | | |
|---|---|---|---|---|
| EP | 4197844 | A1 | 6/2023 | |
| WO | 2023177118 | A1 | 9/2023 | |
| WO | WO-2023248579 | A1 * | 12/2023 | F15B 11/02 |

* cited by examiner

ENERGY RECOVERY PREVENTION FOR A HYDRAULIC SYSTEM

TECHNICAL FIELD

The present disclosure relates generally to a hydraulic system, and, for example, to energy recovery prevention for a hydraulic system of a machine.

BACKGROUND

Work machines, such as excavators, wheel loaders, cranes, and/or other types of heavy equipment, may be used to perform one or more worksite operations (e.g., one or more material transfer operations, digging operations, scraping operations, and/or dozing operations, among other examples). Typically, such machines include a hydraulic system to perform the worksite operations (e.g., to control movement of the machines and/or a component of the machines). For example, an excavator may use a hydraulic system to control movement of the excavator, rotation of a body of the excavator (e.g., for a swing operation), and/or movement of an implement of the excavator that includes a boom, stick, and/or a bucket, among other examples.

An excavator typically includes an engine (e.g., an internal combustion engine) that drives a hydraulic system, and the hydraulic system uses energy recovery circuits (e.g., in association with operations of the excavator) that are designed to recover energy back onto the engine (e.g., by applying a net negative torque, such as a swing/implement braking regenerative torque, to the engine).

However, in some cases, the excavator is an electrically powered excavator (e.g., a tethered excavator) including an electric motor (e.g., that is electrically coupled to an electric power source), rather than an engine, to drive the hydraulic system. This leads to problems and challenges associated with recovering energy via the energy recovery circuits. For example, recovering energy back onto the electric motor during one or more operation intervals may cause battery overcharging (e.g., which can pose risks, such as increased heat generation, accelerated chemical reactions within the battery, and potential damage to battery cells) and current reversal back into the electric power source (e.g., which can lead to grid instability and safety concerns).

Furthermore, there are drawbacks associated with redesigning the hydraulic system to remove or disable the energy recovery circuits from applying the net negative torque to the electric motor. For example, redesigning the hydraulic system to remove or disable the energy recovery circuits from applying the net negative torque to the electric motor leads to an increase in cross-over relief flow, an increase in circuit heat loads, and an increase in cost and complexity of the hydraulic system.

U.S. Pat. No. 9,243,384 ("the '384 patent") describes a hybrid construction machine that prevents an electrical storage device from overcharge. The hybrid construction machine includes a hydraulic actuator, a hydraulic pump, a generator-motor which performs electric generator and motor actions, an engine, an electric actuator which generates regenerative electric power, an electrical storage device which performs a charge-and-discharge action with the generator-motor and the electric actuator, a charge-rate detector which detects a charge rate C1 of the electrical storage device, and a control section which controls an operation of the generator-motor and a charge-and-discharge action of the electrical storage device. The control section, when the charge rate C1 exceeds a set value Cs, performs overcharge-prevention control by making assist power, which is power provided by the generator-motor to the engine, by the electric motor action of the generator-motor to be greater than that when $C1 \leq Cs$, the set value Cs predetermined as a charge rate at which receiving the regenerative electric power can overcharge the electrical storage device.

According to the '384 patent, in the state where $C1 > Cs$, and where the electrical storage device has a risk of being overcharged, the control section sets assist power of the generator-motor to one greater than assist power when $C1 \leq Cs$, thus allowing the electric power discharged by the electrical storage device to be increased to reduce the charge rate thereof and preventing the electrical storage device from being overcharged due to receiving the regenerative electric power.

Accordingly, the '384 patent does not address the problems and challenges associated with recovering energy via energy recovery circuits of a hydraulic system of an electrically powered excavator that includes an electric motor, rather than an engine, to drive the hydraulic system (e.g., at least because the '384 patent relies on increasing assist power provided by the generator-motor to the engine to prevent overcharge of the electrical storage device).

SUMMARY

Some implementations described herein relate to a machine including a hydraulic system that is operable in an energy recovery mode. The machine may include an electric motor; a power source electrically coupled to the electric motor, wherein, during operation of the hydraulic system in the energy recovery mode, a net negative torque is applied to the electric motor causing the electric motor to convert a mechanical input to an electrical input and provide the electrical input to the power source; and a controller configured to: determine a time that the hydraulic system operates in the energy recovery mode; and cause, during the time that the hydraulic system operates in the energy recovery mode, application of an energy recovery prevention torque to the hydraulic system, wherein the energy recovery prevention torque prevents the electric motor from converting the mechanical input to the electrical input and providing the electrical input to the power source.

Some implementations described herein relate to a method for controlling a hydraulic system driven by an electric motor electrically coupled to a power source, the method comprising: determining, by a controller of the hydraulic system, a time that the hydraulic system operates in an energy recovery mode, wherein, during operation of the hydraulic system in the energy recovery mode, a net negative torque is applied to the electric motor causing the electric motor to convert a mechanical input to an electrical input and provide the electrical input to the power source; and causing, by the controller and during the time that the hydraulic system operates in the energy recovery mode, application of an energy recovery prevention torque to the hydraulic system, wherein the energy recovery prevention torque prevents the electric motor from converting the mechanical power input to the electrical power output and providing the electrical input to the power source.

Some implementations described herein relate to a hydraulic system, comprising: an electric motor; a power source electrically coupled to the electric motor, wherein, during operation of the hydraulic system in an energy recovery mode, a net negative torque is applied to the electric motor causing the electric motor to convert a mechanical power output to an electrical input and provide the electrical input to the power source; and a controller configured to: determine a time that the hydraulic system operates in the energy recovery mode; and cause, during the time that the hydraulic system operates in the energy recovery mode, application of an energy recovery prevention torque to the hydraulic system, wherein the energy recovery prevention torque prevents the electric motor from converting the mechanical power output to the electrical input and providing the electrical input to the power source.

DETAILED DESCRIPTION OF EXAMPLE EMBODIMENTS

The following detailed description of example implementations refers to the accompanying drawings. The same reference numbers in different drawings may identify the same or similar elements.

Figure 1:
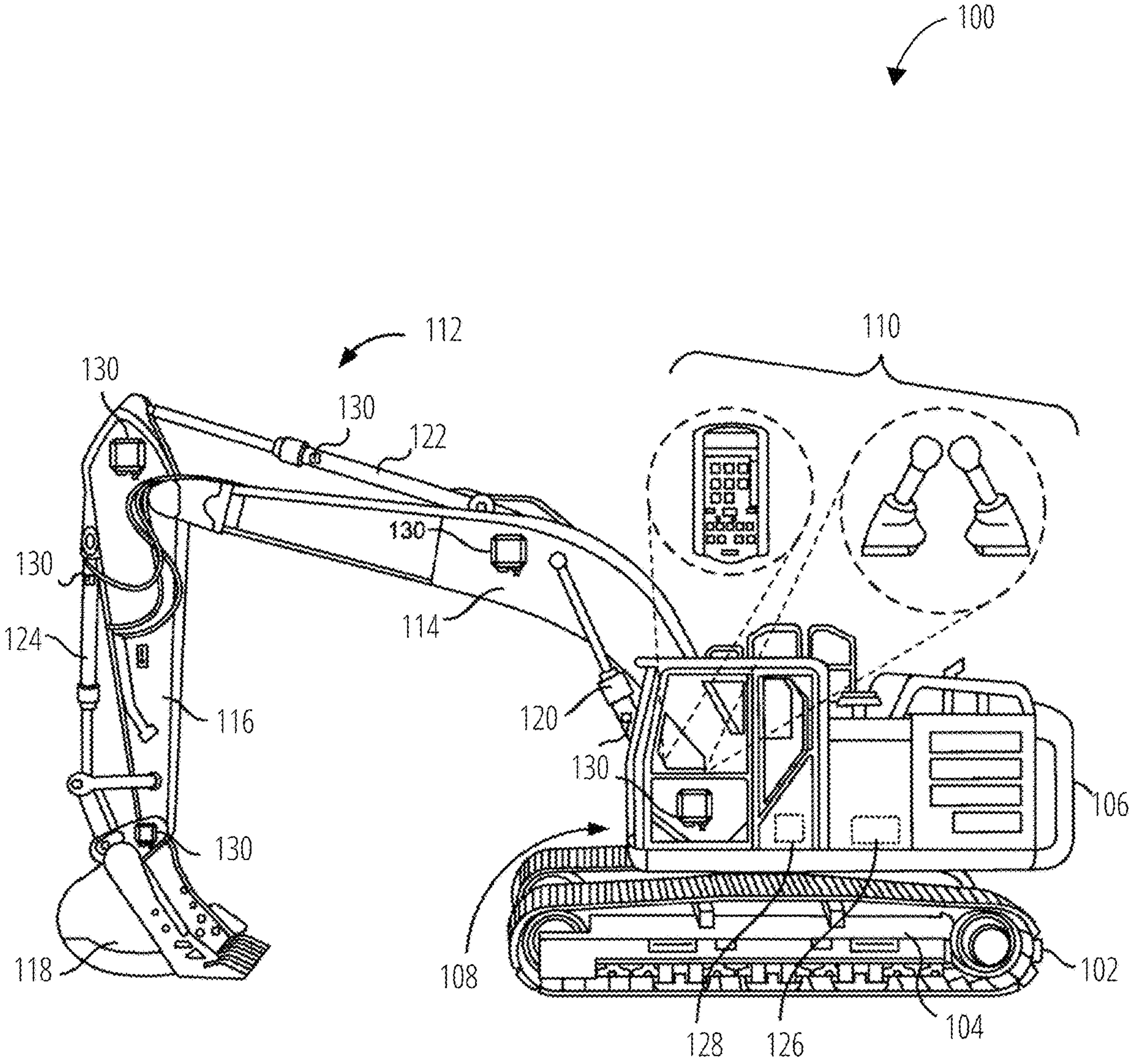
FIG. 1 is a diagram of an example machine described herein.

The present disclosure relates to energy recovery prevention in a hydraulic system (e.g., a hybrid hydraulic system). FIG. 1 is a diagram of an example machine 100 described herein. As shown in FIG. 1, the machine 100 is embodied as an excavator. Although the machine 100 is embodied as an excavator, the machine 100 may be any suitable machine (e.g., a haul truck, a dozer, a loader, a backhoe, a motor grader, a wheel tractor scraper, and/or another earth moving machine, among other examples).

As further shown in FIG. 1, the machine 100 includes ground-engaging members 102 (e.g., shown as tracks in FIG. 1) for propelling the machine 100. The ground-engaging members 102 are mounted on a car body 104 and are driven by a travel circuit (e.g., an open circuit hydraulic system, among other examples). In some implementations, the machine 100 may be powered by a battery and/or an external power source (e.g., the machine 100 may be a tethered machine).

The car body 104 supports a machine body 106 and an operator station 108. The operator station 108 is supported by, and/or is included within, the machine body 106, which is supported by a rotatable frame situated between the machine body 106 and the car body 104. The operator station 108 includes one or more operator interfaces 110 (e.g., shown as an integrated display and joysticks in FIG. 1).

As further shown in FIG. 1, the machine 100 includes a linkage assembly 112 that includes a boom member 114, a stick member 116, and a bucket 118. The linkage assembly 112 may include other types of work tools, such as a hammer drill and/or a ripper, among other examples. The machine 100 may include a hydraulic system (e.g., having multiple hydraulic circuits) to control one or more functions and/or operations associated with the machine 100, the machine body 106, and/or the linkage assembly 112. For example, the machine 100 may use the hydraulic system to perform a boom-up or boom-down operation associated with the boom member 114, a stick-in or stick-out operation associated with the stick member 116, a bucket-in or bucket-out operation associated with the bucket 118, and/or a swing operation associated with the machine body 106, among other examples. Such operations may be performed in association with one or more operations of the machine 100 (e.g., one or more grading operations, dig operations, material transfer operations, and/or travel operations, among other examples).

As further shown in FIG. 1, the boom member 114 is pivotably mounted to the machine body 106 at a proximal end of the boom member 114. The boom member 114 is articulated relative to the machine body 106 by a boom actuator 120 (e.g., a fluid actuation cylinder, among other examples) of the hydraulic system. A proximal end of the stick member 116 is pivotably mounted to the boom member 114 at a distal end of the boom member 114. The stick member 116 is articulated relative to the boom member 114 by a stick actuator 122 of the hydraulic system. A proximal end of the bucket 118 is pivotably mounted to the stick member 116 at a distal end of the stick member 116. The bucket 118 is articulated relative to the stick member 116 by a bucket actuator 124 of the hydraulic system.

The hydraulic system of the machine 100 may include one or more (e.g., multiple) hydraulic pumps (e.g., shown as hydraulic pump 126 in FIG. 1) that provide a flow source (e.g., at a fixed flow rate or a variable flow rate) of fluid (e.g., oil or another type of hydraulic fluid) to one or more hydraulic circuits (e.g., one or more hydraulic circuits associated with the boom actuator 120, the stick actuator 122, the bucket actuator 124, one or more swing actuators (not shown) to swing the machine body 106, one or more travel actuators (not shown), and/or one or more energy recovery actuators, among other examples) of the hydraulic system. For example, the hydraulic pump 126 may provide fluid, from a discharge line fluidly coupled to a discharge end of the hydraulic pump 126, to the one or more hydraulic circuits. The flow of the fluid through the one or more hydraulic circuits may be controlled via electromechanical control of one or more valves (e.g., one or more control valves, among other examples) of the one or more hydraulic circuits.

As further shown in FIG. 1, the machine 100 includes a controller 128 (e.g., an electronic control module (ECM), among other examples). The controller 128 may include one or more memories (e.g., one or more non-transitory computer-readable mediums) and one or more processors communicatively coupled to the one or more memories. Communicative coupling between the one or more processors and the one or more memories may enable the one or more processors to read and/or process information stored in the one or more memories and/or to store information in the one or more memories.

In some implementations, the one or more memories may include one or more volatile and/or nonvolatile memories. For example, the one or more memories may include one or more random access memories (RAMs), read only memories (ROMs), hard disk drives, and/or other types of memories (e.g., flash memories, magnetic memories, and/or optical memories, among other examples). The one or more memories may include one or more internal memories (e.g., one or more RAMs, ROMs, or hard disk drives) and/or one or more removable memories (e.g., removable via universal serial bus connections). The one or more memories may store information, one or more instructions, and/or software (e.g., one or more software applications) related to the operation of the controller 128.

The controller 128 may include an input component that enables the controller 128 to receive input, such as operator input (e.g., from the operator interfaces 110) and/or sensed input (e.g., from one or more sensors). For example, the input component may include a touch screen, a keyboard, a keypad, a mouse, a button, a microphone, a switch, a sensor, a global positioning system sensor, an accelerometer, a gyroscope, and/or an actuator, among other examples.

The controller 128 may include an output component that enables the controller 128 to provide output, such as via a display, a speaker, and/or a light-emitting diode. The controller 128 may include a communication component that enables the controller 128 to communicate with other devices via a wired connection and/or a wireless connection. For example, the communication component may include a receiver, a transmitter, a transceiver, a modem, a network interface card, and/or an antenna, among other examples.

In some implementations, the controller 128 may be communicatively coupled to one or more sensors 130 associated with the machine 100 and/or one or more components of the machine 100. The sensors 130 may detect and/or measure information associated with the machine 100 and/or the one or more components of the machine 100. As an example, the one or more sensors 130 may detect and/or measure information associated with one or more operations of the machine 100, energy recovery events, and/or energy recovery conditions associated with the machine 100.

As an example, to detect a boom lowering operation of the machine 100, the one or more sensors 130 may include one or more angle sensors (e.g., one or more potentiometers and/or encoders to measure an angular position of the boom member 114), one or more load sensors (e.g., one or more strain gauges and/or load cells to measure a load and/or a force exerted on the boom member 114), one or more hydraulic pressure sensors (e.g., to monitor a hydraulic pressure in the actuators controlling the boom member 114), and/or one or more speed sensors (e.g., one or more tachometers and/or rotary encoders to measure a rotational speed of the hydraulic components associated with the boom member 114).

As another example, to detect a swing deceleration event associated with a swing operation of the machine 100, the one or more sensors 130 may include one or more angular velocity sensors (e.g., one or more gyroscopes and/or rotary encoders to measure a rate of rotation or angular velocity of the rotatable machine body 106 of the machine 100 during a swing operation), one or more acceleration sensors (e.g., one or more accelerometers to measure the acceleration of the rotatable machine body 106), one or more proximity sensors (e.g., one or more ultrasonic and/or infrared sensors to detect a proximity of the rotatable machine body 106 relative to predefined boundaries or obstacles), and/or one or more load sensors (e.g., positioned on a swing mechanism of the machine 100 to measure a load on the swing mechanism).

The sensors 130 may send, and the controller 128 may receive, information associated with the machine 100 and/or the one or more components of the machine 100 (e.g., the hydraulic system, among other examples). The controller 128 (e.g., using the one or more memories and the one or more processors) may perform one or more actions associated with the machine 100 and/or the one or more components of the machine 100 based on the information received from the sensors 130, as described in more detail elsewhere herein.

In some implementations, the hydraulic system may include a hydraulic load circuit and an energy recovery circuit. The hydraulic load circuit may include a hydraulic pump in fluid communication with a hydraulic actuator. The energy recovery circuit may include an energy recovery pump/motor (e.g., a hydrostatic drive) in fluid communication with an energy recovery actuator. The hydraulic pump and the energy recovery pump/motor may be mechanically coupled to an electric motor of the machine 100. The electric motor may be electrically coupled to a power source. The hydraulic system may include a control valve that is in fluid communication with the hydraulic pump, the hydraulic actuator, the energy recovery pump/motor, and the energy recovery actuator.

In some implementations, the hydraulic system may be operable in one or more modes. As an example, the hydraulic system may be operable in an energy recovery mode. During operation of the hydraulic system in the energy recovery mode, a net negative torque is applied to the electric motor causing the electric motor to convert a mechanical input to an electrical input and provide the electrical input to the power source.

To prevent the electric motor from converting the mechanical power input to the electrical input and providing the electrical input to the power output (e.g., to be fed to the power source), the controller causes, during the time that the hydraulic system operates in the energy recovery mode, application of an energy recovery prevention torque to the hydraulic system. The energy recovery prevention torque prevents the electric motor from converting the mechanical input to the electrical input and providing the electrical input to the power source, as described in more detail elsewhere herein.

As indicated above, FIG. 1 is provided as an example. Other examples may differ from what is described in connection with FIG. 1.

Figure 2:
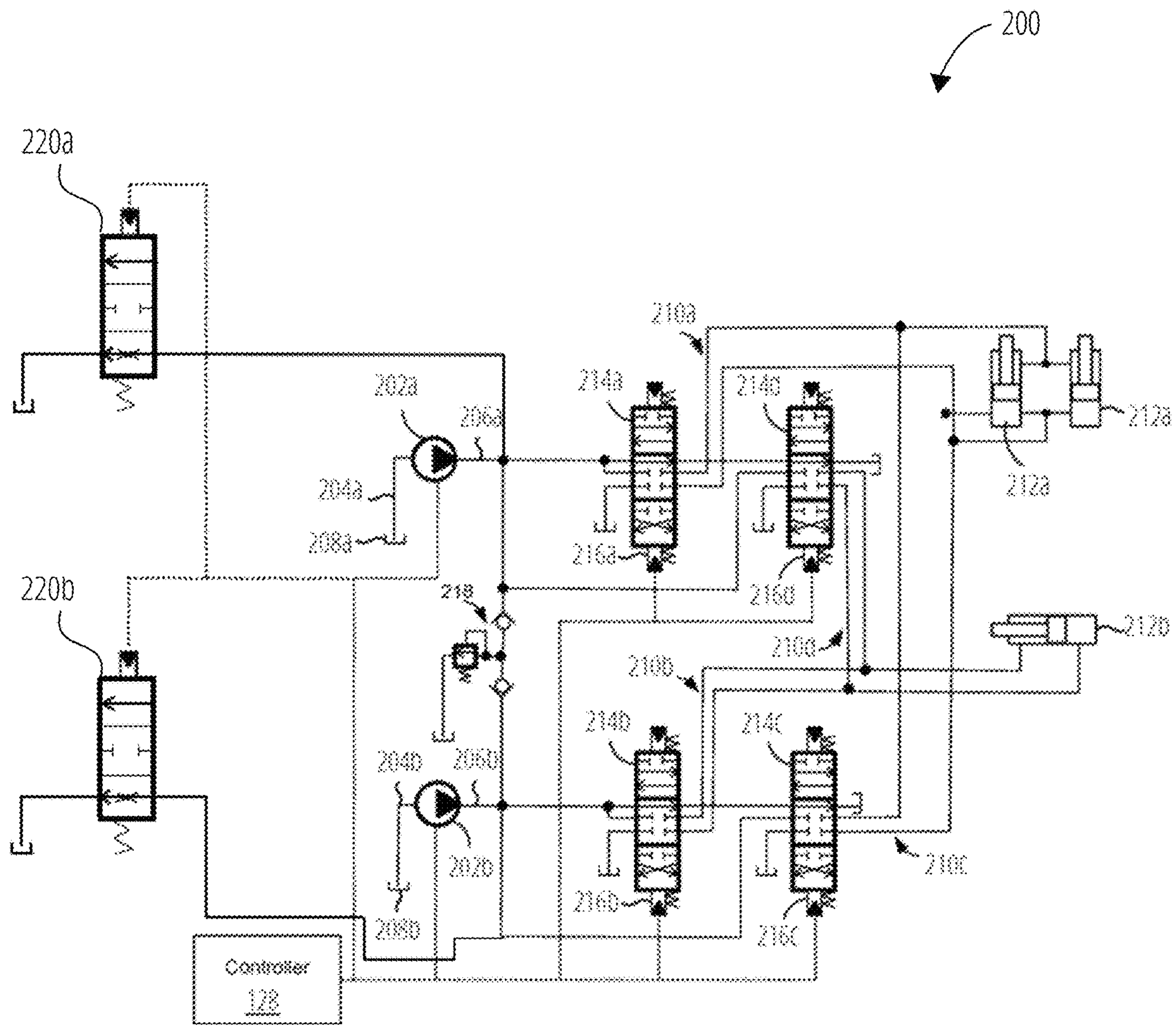
FIG. 2 is a diagram of an example hydraulic system, in accordance with some embodiments of the present disclosure.

FIG. 2 is a diagram of an example hydraulic system 200 described herein. The hydraulic system 200 includes multiple hydraulic pumps, shown as a first hydraulic pump 202*a* and a second hydraulic pump 202*b* in FIG. 2 (which may correspond to the hydraulic pump 126 of the machine 100 of FIG. 1). In some implementations, the hydraulic system 200 may include more than two hydraulic pumps, such as three hydraulic pumps or four hydraulic pumps, among other examples.

As further shown in FIG. 2, the hydraulic system 200 includes suction lines 204*a* and 204*b*, discharge lines 206*a* and 206*b*, and fluid reservoirs 208*a* and 208*b*. The suction line 204*a* is fluidly coupled to the fluid reservoir 208*a* and to an intake end of the first hydraulic pump 202*a*. The suction line 204*b* is fluidly coupled to the fluid reservoir 208*b* and to an intake end of the second hydraulic pump 202*b*. In some implementations, the suction line 204*a* and the suction line 204*b* may share the same fluid reservoir.

As further shown in FIG. 2, the discharge line 206*a* is fluidly coupled to a discharge of the first hydraulic pump 202*a*, to circuit lines (and/or circuit valves) of hydraulic circuits 210*a* and 210*d*, and to the fluid reservoir 208*a*. The discharge line 206*b* is fluidly coupled to a discharge of the second hydraulic pump 202*b*, to circuit lines (and/or circuit valves) of hydraulic circuits 210*b* and 210*c*, and to the fluid reservoir 208*b*. The first hydraulic pump 202*a* may be any suitable fluid pumping mechanism that draws, via the suction line 204*a*, fluid from the fluid reservoir 208*a* to cause the fluid to flow through discharge line 206*a* to the hydraulic circuits 210*a* and 210*d* and back to the fluid reservoir 208*a*. Similarly, the second hydraulic pump 202*b* may be any suitable fluid pumping mechanism that draws, via the suction line 204*b*, fluid from the fluid reservoir 208*b* to cause the fluid to flow through discharge line 206*b* to the hydraulic circuits 210*b* and 210*c* and back to the fluid reservoir 208*b*.

As further shown in FIG. 2, the hydraulic system 200 includes a first actuator 212*a* (e.g., shown as two hydraulic cylinders in FIG. 2) and a second actuator 212*b* (e.g., shown as a single hydraulic cylinder in FIG. 2). As used herein, an "actuator" may refer to a single actuator or a set of actuators. The first actuator 212*a* may control a first linkage member of a linkage assembly of the machine 100. For example, the first actuator 212*a* may correspond to the boom actuator 120 that controls the boom member 114 of the linkage assembly 112 of the machine 100.

The second actuator 212*b* may control a second linkage member connected to the first linkage member and to a work implement of the machine 100. For example, the second actuator 212*b* may correspond to the stick actuator 122 that controls the stick member 116 of the linkage assembly 112 of the machine 100. In some implementations, the hydraulic system 200 may include one or more additional actuators, such as an actuator to control a work implement (e.g., the bucket 118 of the machine 100) and/or an actuator to control a swing of the machine 100, among other examples.

As further shown in FIG. 2, the hydraulic circuit 210*a* includes the fluid reservoir 208*a*, the first hydraulic pump 202*a*, a valve 214*a*, and the first actuator 212*a*. The hydraulic circuit 210*a* may be a primary hydraulic circuit (e.g., a first primary hydraulic circuit) of the first actuator 212*a*. For example, the hydraulic circuit 210*a* may be a primary boom hydraulic circuit of the boom actuator 120. The hydraulic circuit 210*c* includes the fluid reservoir 208*b*, the second hydraulic pump 202*b*, a valve 214*c*, and the first actuator 212*a*. The hydraulic circuit 210*c* may be a secondary hydraulic circuit (e.g., a first secondary hydraulic circuit) of the first actuator 212*a*. For example, the hydraulic circuit 210 *c* may be a secondary boom hydraulic circuit of the boom actuator 120.

The hydraulic circuit 210*a* and the hydraulic circuit 210*c* may, in concert, provide control of the first actuator 212*a* (e.g., via the valves 214*a* and 214*c*), which may be associated with an operation and/or a function of the machine 100. For example, the hydraulic circuit 210*a* and the hydraulic circuit 210*c* may, in concert, provide control of the boom actuator 120 (e.g., to perform a boom-up or boom-down operation associated with the boom member 114, among other examples). Thus, the first hydraulic pump 202*a* and the second hydraulic pump 202*b* may together control the first actuator 212*a* via the hydraulic circuit 210*a* and the hydraulic circuit 210*c*, respectively.

As further shown in FIG. 2, the hydraulic circuit 210*b* includes the fluid reservoir 208*b*, the second hydraulic pump 202*b*, a valve 214*b*, and the second actuator 212*b*. The hydraulic circuit 210*b* may be a primary hydraulic circuit (e.g., a second primary hydraulic circuit) of the second actuator 212*b*. For example, the hydraulic circuit 210*b* may be a primary stick hydraulic circuit of the stick actuator 122. The hydraulic circuit 210*d* includes the fluid reservoir 208*a*, the first hydraulic pump 202*a*, a valve 214*d*, and the second actuator 212*b*. The hydraulic circuit 210*d* may be a secondary hydraulic circuit (i.e., a second secondary hydraulic circuit) of the second actuator 212*b*. For example, the hydraulic circuit 210*d* may be a secondary stick hydraulic circuit of the stick actuator 122.

The hydraulic circuit 210*b* and the hydraulic circuit 210*d* may, in concert, provide control of the second actuator 212*b* (e.g., via the valves 214*b* and 214*d*), which may be associated with an operation and/or function of the machine 100. For example, the hydraulic circuit 210*b* and the hydraulic circuit 210*d* may, in concert, provide control of the stick actuator 122 (e.g., to perform a stick-in or stick-out operation associated with the boom member 114, among other examples). Thus, the first hydraulic pump 202*a* and the second hydraulic pump 202*b* may together control the second actuator 212*b* via the hydraulic circuit 210*b* and the hydraulic circuit 210*d*, respectively.

In some implementations, the hydraulic system 200 may include one or more additional hydraulic circuits controlled by the first hydraulic pump 202*a*, one or more additional hydraulic circuits controlled by the second hydraulic pump 202*b*, and/or one or more additional hydraulic circuits controlled by one or more additional hydraulic pumps. For example, the hydraulic system 200 may include a hydraulic circuit for control of a work implement (e.g., the bucket 118), a hydraulic circuit for control of a swing of the machine 100, one or more hydraulic circuits for control of a travel system, and/or one or more hydraulic circuits for energy recovery from the hydraulic system, among other examples.

The valves 214*a*, 214*b*, 214*c*, and 214*d* each may be any suitable valve that is capable of being controlled by respective valve control devices 216*a*, 216*b*, 216*c*, and 216*d* (e.g., based on receiving instructions from the controller 128). For example, the valves 214*a* to 214*d* may be spool valves. The valves 214*a* to 214*d* may be individually configured spool valves with electromechanical configurations for functional control of the actuators 212*a* and 212*b* (e.g., according to responsiveness, performance, sizes, ranges of operation, and/or cylinder type, among other examples).

The first hydraulic pump 202*a*, during operation, and according to configurations of the valves 214*a* and 214*d* (e.g., based on settings for positions of the valves), causes fluid to flow to, through, and/or from the hydraulic circuits 210*a* and 210*d*. Any adjustment to an opening of one of the valves 214*a* or 214*d* would likely affect, due to physical properties of the hydraulic system 200, flow through a hydraulic circuit 210*a* or 210*d* that is not associated with the adjusted valve 214*a* or 214*d*. The second hydraulic pump 202*b*, during operation, and according to configurations of the valves 214*b* and 214*c* (e.g., based on settings for positions of the valves), causes fluid to flow to, through, and/or from the hydraulic circuits 210*b* and 210*c*. Any adjustment to an opening of one of the valves 214*b* or 214*c* would likely affect, due to physical properties of hydraulic system 200, flow through a hydraulic circuit 210*b* or 210*c* that is not associated with the adjusted valve 214*b* or 214*c*.

As described herein, the controller 128 is configured to cause the valve control devices 216*a* to 216*d* to configure or position one or more components (e.g., one or more spools, stems, actuators, plugs, and/or apertures, among other examples) of the valves 214*a* to 214*d*, respectively, to increase and/or decrease an opening of the valves 214*a* to 214*d* (e.g., by increasing or decreasing an area of a passageway that flows through one or more of the respective valves 214*a* to 214*d*).

Accordingly, the controller 128 may send, and the valve control devices 216*a* to 216*d* may receive, command signals (e.g., and/or other instructions) to set positions of spools of the valves 214*a* to 214*d*, respectively, to control the sizes of openings and, correspondingly, the flow of the fluid throughout the hydraulic circuits 210*a* to 210*d* (e.g., according to a hydraulic flow command, among other examples). As further shown in FIG. 2, the controller 128 is configured to cause the first hydraulic pump 202*a* and the second hydraulic pump 202*b* to increase and/or decrease a rate of flow of fluid (e.g., increase and/or decrease a pressurization of fluid) to the hydraulic circuits 210*a* to 210*d*. As further shown in FIG. 2, the hydraulic system 200 includes a pressure relief component 218. The pressure relief component 218 may relieve pressure in the hydraulic system 200 if a pressure exceeds a threshold.

As further shown in FIG. 2, the hydraulic system 200 includes a first bypass valve 220*a* and a second bypass valve 220*b*. In some implementations, the first bypass valve 220*a* and the second bypass valve 220*b* may be controlled to avoid unintended movement of the machine 100. As an example, the first bypass valve 220*a* and/or the second bypass valve 220*b* may be set to an open position to allow a requested flow to return to tank.

As indicated above, FIG. 2 is provided as an example. Other examples may differ from what was described in connection with FIG. 2.

Figure 3:
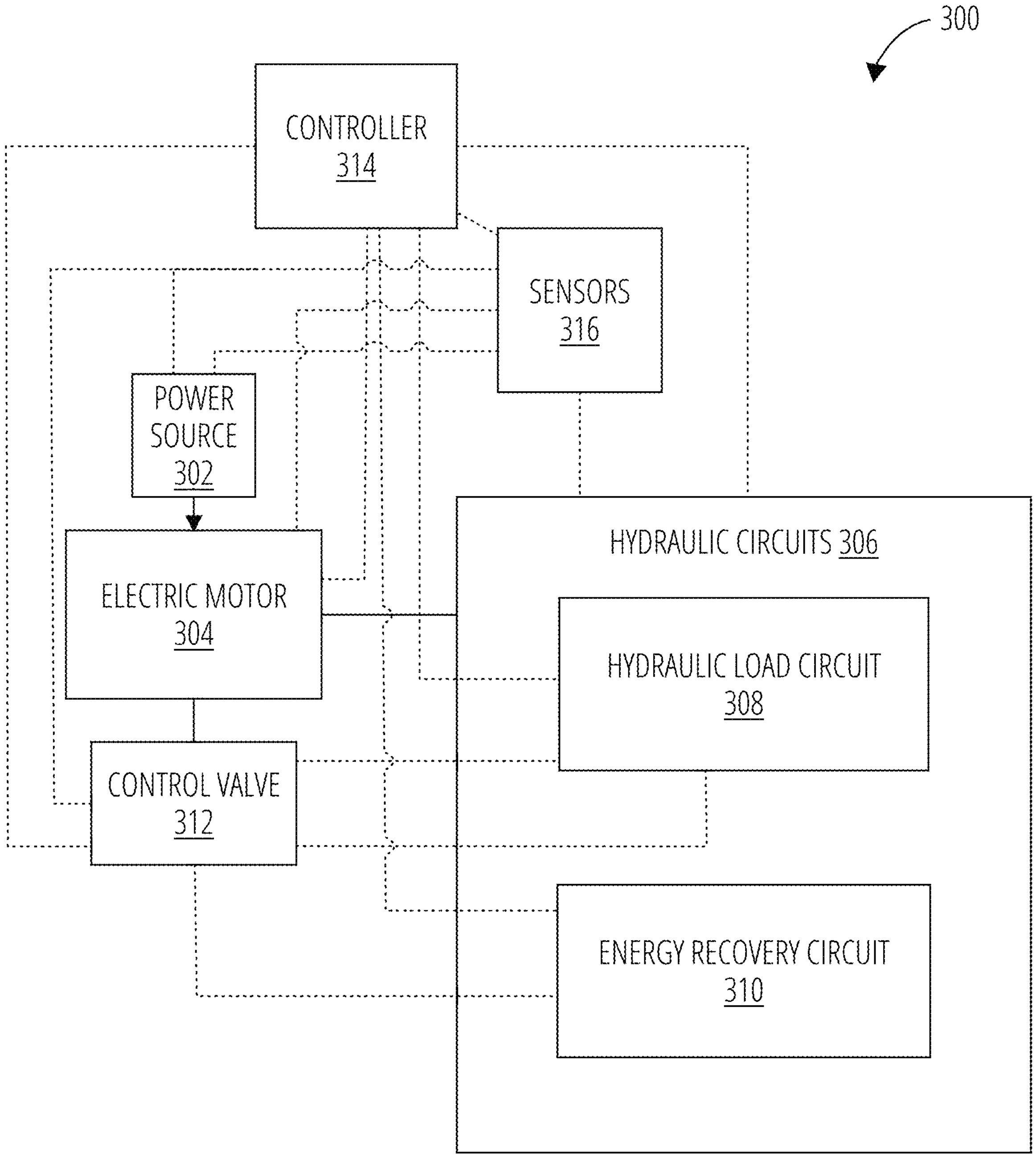
FIG. 3 is a diagram of an example system in which example devices and/or methods described herein may be implemented.

FIG. 3 is a diagram of an example system 300 in which example devices and/or example methods, described herein, may be implemented. As shown in FIG. 3, the system 300 includes a power source 302, an electric motor 304, hydraulic circuits 306 (e.g., shown as a hydraulic load circuit 308 and an energy recovery circuit 310 in FIG. 3), a control valve 312, a controller 314, and one or more sensors (e.g., shown as sensors 316 in FIG. 3). The system 300 may include one or more components described in connection with the machine 100 of FIG. 1 and/or the hydraulic system 200 of FIG. 2. Furthermore, one or more components of the system 300 may correspond to one or more components shown and described in connection with the machine 100 of FIG. 1 and the hydraulic system 200 of FIG. 2.

The power source 302 may be an electric power source, such as a power grid, a battery, and/or a generator, among other examples. The power source 302 provides electric power (e.g., via an electric power output) to the electric motor 304 (e.g., the power source 302 may provide a stable and controlled electrical voltage to the electric motor 304). In some implementations, the power source 302 may be a battery equipped on the machine 100 and/or an external power source, such as an external generator, powerline, and/or power grid, among other examples, electrically coupled to the machine 100 (e.g., the machine 100 may be a tethered machine).

The electric power may be distributed through a circuit or electric system to reach the electric motor 304 (e.g., the circuit or electric system may include switches, relays, and/or control circuits, among other examples, to manage the flow of electricity from the power source 302 to the electric motor 304). The electric motor 304 motor converts the electrical power into mechanical energy to drive the hydraulic components of the system 300, as described in more detail elsewhere herein.

The electric motor 304 may include a stator (e.g., a stationary part) and a rotor (e.g., a rotating part). The rotor may be operatively connected to a shaft. When the electric power is supplied to the electric motor 304, the electric motor 304 creates a magnetic field in the stator which causes the rotor, connected to the shaft, to rotate. The rotational motion of the shaft is transmitted to the hydraulic components of the system 300 through a mechanical transmission system (e.g., which may include gears, belts, or a direct coupling, among other examples).

The mechanical energy from the electric motor 304 may be used to drive a hydraulic pump (e.g., a hydraulic pump included in the hydraulic circuits). The hydraulic circuits 306 may be any suitable hydraulic circuits including one or more hydraulic components (e.g., one or more hydraulic pumps, valves, and/or actuators, among other examples).

In some implementations, the hydraulic load circuit 308 may be a hydraulic circuit that applies a load to the electric motor 304. As an example, the hydraulic load circuit 308 may be a hydraulic fan circuit (e.g., that applies a load associated with operating a fan), an accessory circuit (e.g., that applies a load associated with operating an accessory), an implement circuit (e.g., that applies a load associated with operating an implement), a swing circuit (e.g., that applies a load associated with operating swing components), and/or an energy recovery circuit (e.g., that applies a load associated with operating energy recovery devices), among other examples).

The energy recovery circuit 310 may include one or more energy recovery devices, such as one or more energy recovery pumps (e.g., one or more hydrostatic drives) and/or one or more energy recovery actuators (e.g., one or more valves and/or one or more EP controllers, among other examples), that are used to recover energy from the system 300. As an example, the energy recovery circuit 310 may recover energy during one or more energy recovery events (e.g., one or more swing deceleration events and/or boom lowering events) and/or during a time that one or more energy recovery conditions are satisfied (e.g., during a time that a torque threshold is satisfied, a speed threshold is satisfied, and/or a load threshold is satisfied, among other examples). During energy recovery, a net negative torque is applied to the electric motor 304, as described in more detail elsewhere herein. Accordingly, in some implementations, the net negative torque decreases in magnitude during the time that the system 300 operates in an energy recovery mode (e.g., during deceleration).

The control valve 312 may be a main control valve that selectively directs the hydraulic fluid to different circuits, enabling control of various operations and/or functions of the machine 100. The control valve 312 may include an assembly of valves and passages designed to manage the flow and pressure of hydraulic fluid. As an example, the control valve 312 may include spools (e.g., each spool has specific flow paths and ports that align or block depending on its position), a valve body (e.g., having inlet and outlet ports connected to the hydraulic pump and hydraulic circuits), and/or one or more actuators (e.g., hydraulic cylinders or solenoids that move spools within the valve body to a position that determines flow paths and a direction of the hydraulic fluid).

As shown in FIG. 3, the control valve 312 is connected to the hydraulic load circuit 308. During a first energy recovery mode (e.g., a hydrostatic, or hystat, energy recovery), the control valve 312 is not connected to the energy recovery circuit 310. During a second energy recovery mode (e.g., a gravity-assisted energy recovery) the control valve 312 is connected to the energy recovery circuit 310.

The controller 314 may be communicatively coupled to the sensors 316. The sensors 316 may detect and/or measure information associated with the machine 100 and/or the one or more components of the machine 100, as described in more detail elsewhere herein.

In some implementations, the time that the net torque applied to the electric motor is the net negative torque value is an energy recovery period triggered by initiation of an energy recovery event. In some implementations, the system 300 may include multiple hydraulic load circuits (e.g., a fan circuit, an accessory circuit, implement circuits, an auxiliary circuit) having multiple hydraulic pumps and multiple actuators and an energy recovery circuit having an energy recovery pump and an energy recovery actuator (e.g., one or more valves and/or one or more EP controllers, among other examples).

The electric motor may drive the multiple hydraulic pumps of the multiple hydraulic load circuits and/or the energy recovery pump/motor (e.g., during operation of the energy recovery pump/motor in a pump mode). The controller may monitor a net torque applied to the electric motor by each hydraulic pump mechanically coupled to the electric motor. As an example, the controller may calculate the net torque applied to the electric motor to detect a time that the net torque applied to the electric motor is a net negative torque value. The controller may determine that the system 300 is operating in an energy recovery mode based on the net negative torque value. In other words, if the net torque applied to the electric motor is a net negative torque value, then the system 300 is operating in the energy recovery mode.

Additionally, or alternatively, the controller may monitor sensor data, command inputs (e.g., received by the controller 314 from the sensors 316 and/or one or more operator interfaces) and/or an operation or function state associated with the machine 100 to determine the time that the system 300 is operating in the energy recovery mode (e.g., a current time or a time that is later than the current time). In other words, the controller may monitor the sensor data, the command inputs and/or the operation or function states of the machine to determine a time that the net torque applied to the electric motor is a net negative torque (e.g., a swing/implement regenerative braking torque).

Based on determining the time that the system 300 is operating in the energy recovery mode, the controller may cause application of one or more energy recovery prevention torques to one or more hydraulic load circuits to offset the net negative torque applied to the electric motor (e.g., during an energy recovery period associated with an energy recovery event) and prevent the electric motor from converting a mechanical power input to an electrical input to be fed back to the power source. In some implementations, the one or more energy recovery prevention torques may be associated with feed forward/predictive torque loading (e.g., included in control logic for swing braking events).

The number and arrangement of devices shown in FIG. 3 are provided as an example. In practice, there may be additional devices, fewer devices, different devices, or differently arranged devices than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the system 300 may perform one or more functions described as being performed by another set of devices of the system 300.

Figure 4:
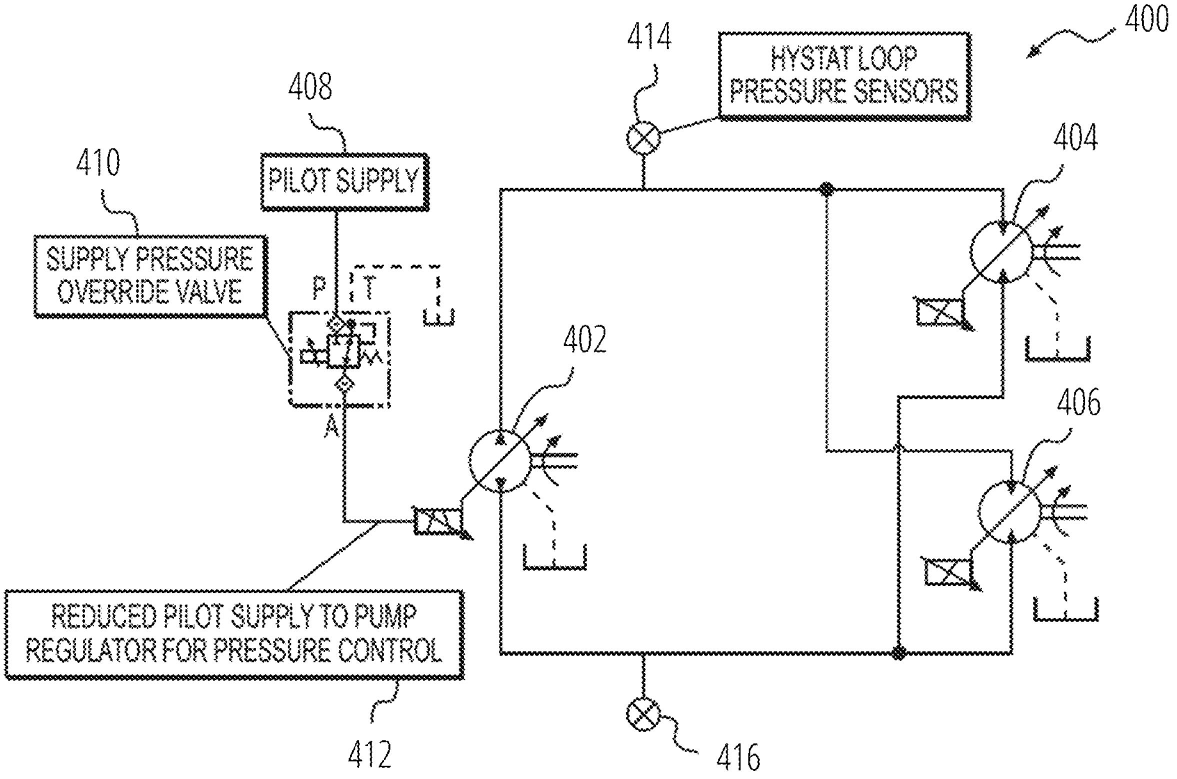
FIG. 4 is a diagram of an example closed loop hydrostatic pressure system, in accordance with some embodiments of the present disclosure.

FIG. 4 is an example diagram of a closed loop hydrostatic pressure system 400. The closed loop hydrostatic pressure system 400 includes a hydrostatic swing pump 402, one or more hydraulic motors (e.g., shown as hydraulic motors 404 and 406 in FIG. 4), a source of pilot supply pressure 408, a supply pressure override valve 410, a reduced pilot supply pressure 412, and one or more hydrostatic loop pressure sensors (e.g., shown as hydrostatic loop pressure sensors 414 and 416 in FIG. 4). The hydrostatic swing pump is fluidly connected to the hydraulic motors 404 and 406, which are operatively connected to a machine body of a machine (e.g., the machine body 106 of the machine 100 of FIG. 1).

The source of pilot supply pressure 408 is fluidly connected to the supply pressure override valve 410. The supply pressure override valve 410 is fluidly connected to the hydrostatic swing pump 402 (e.g., through a pump regulator associated with the hydrostatic swing pump 402). The source of pilot supply pressure 408 and the supply pressure override valve 410 may provide the reduced pilot supply pressure 412 to the hydrostatic swing pump 402 (e.g., via the pump regulator). Additionally, or alternatively, the closed loop hydrostatic pressure system 400 may include a pressure control device (e.g., a closed-loop control device), which adjusts pump displacement based on an overall system pressure. The hydrostatic loop pressure sensors 414 and 416 may produce signals indicative of resulting hydraulic fluid pressures on opposite sides of the hydrostatic swing pump 402.

The number and arrangement of devices shown in FIG. 4 are provided as an example. In practice, there may be additional devices, fewer devices, different devices, or differently arranged devices than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of the closed loop hydrostatic pressure system 400 may perform one or more functions described as being performed by another set of devices of the closed loop hydrostatic pressure system 400.

Figure 5:
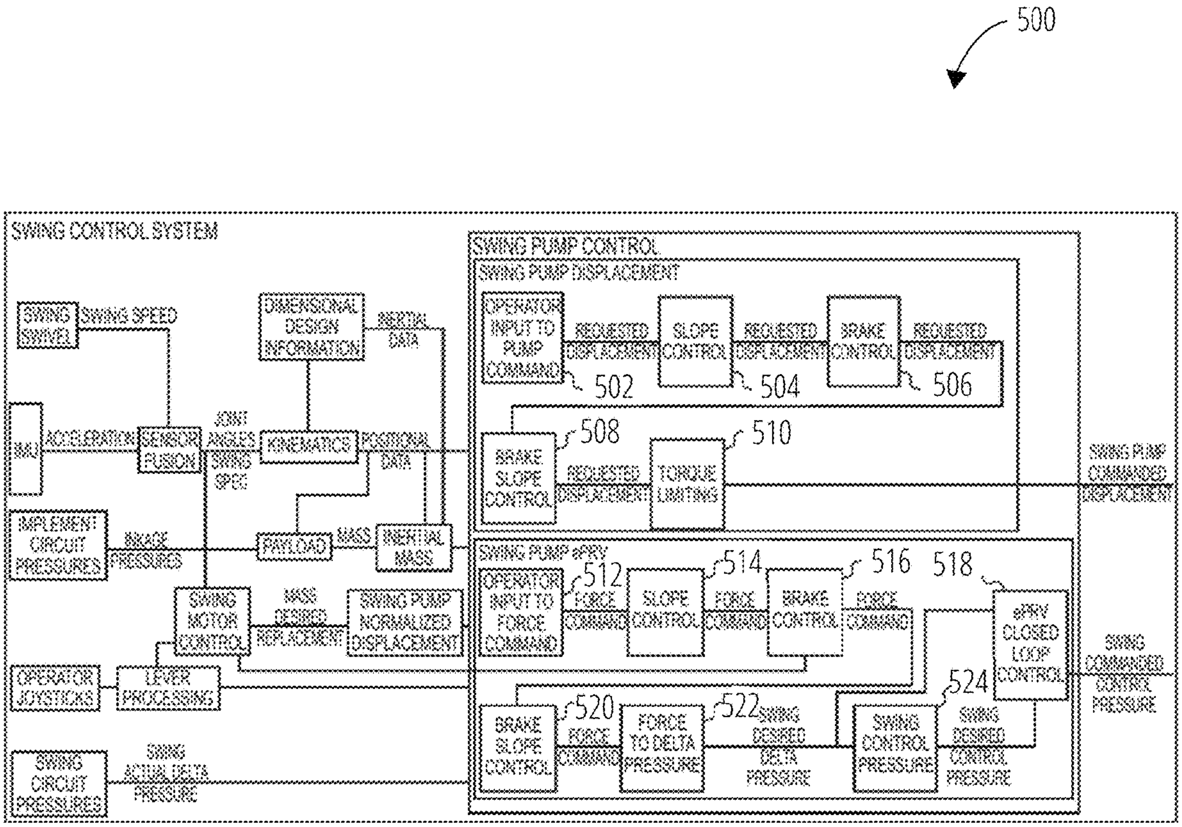
FIG. 5 is a diagram of an example swing motion actuation and control system, in accordance with some embodiments of the present disclosure.

FIG. 5 is a diagram of an example swing motion actuation and control system 500. The closed loop hydrostatic pressure system 400, in conjunction with the swing motion actuation control system 500, may control a commanded displacement of the hydrostatic swing pump 402 and a swing commanded control pressure (e.g., an output pressure), which may be controlled by a swing pump electronic pressure reducing valve (ePRV) associated with the hydrostatic swing pump 402. The resulting commanded displacement of the hydrostatic swing pump 402 and the swing commanded control pressure from the ePRV valve may be controlled to mitigate drift of a swing mechanism (e.g., the linkage assembly 112, including the boom member 114, the stick member 116, and the bucket 118 of the machine 100 of FIG. 1), which may be caused by gravity effects when the machine (e.g., the machine 100 of FIG. 1) operates on a slope or uneven ground, among other examples.

In some implementations, the swing motion actuation and control system 500 may determine and implement swing pump displacement slope control, swing pump ePRV slope control, swing pump displacement brake slope control, and swing pump ePRV brake slope control. The swing motion actuation and control system 500 may command an offset for a desired hydrostatic pump displacement that is based on one or more inputs and/or one or more factors, such as an operator input to pump command 502, slope control 504, brake control 506, brake slope control 508, and/or torque limiting 510 (e.g., which may be a function of desired engine torque limits and/or characteristics of a machine, an age of the machine, desired wear characteristics, and/or other consumer-determined inputs), among other examples. A payload carried by a tool of the machine (e.g., the bucket 118 of the machine 100 of FIG. 1), and an inertial mass of swing components and the payload, may also be inputs to the swing motion actuation and control system 500.

In some implementations, the swing motion actuation and control system 500 may command an offset in a desired pump displacement for the hydrostatic pump 402 intended to increase the pump displacement when a machine (e.g., the machine 100 of FIG. 1) requires a greater amount of hydraulic fluid flow to swing the swing components and the payload carried by a tool of the machine and to maintain a constant speed of motion of the swing components while a machine operator is commanding the machine to move a boom member (e.g., the boom member 114), a stick member (e.g., the stick member 116), and the tool (e.g., the bucket 118) in a direction of increasing slope. This commanded offset to increase pump displacement may be implemented when the machine is positioned on a slope, with digging being performed at a lower point in the direction of gravity on the slope, the boom member, the stick member, and the tool, and the carried payload being commanded to swing from the lower point to a higher point in the direction of gravity. The swing motion actuation and control system 500 may automatically increase pump displacement to a relatively larger pump displacement when a sensed inertial mass of the swing components and/or the payload is relatively larger. When the machine operates on flat ground, the swing motion actuation and control system 500 may maintain the displacement output of the hydrostatic pump 402 at a constant level (e.g., because there are no gravitational effects that cause drifting of the swing mechanism).

In some implementations, the swing motion actuation and control system 500 may command an offset in a desired pump displacement for the hydrostatic pump 402 intended to decrease the pump displacement when the machine (e.g., the machine 100 of FIG. 1) requires a lesser amount of hydraulic fluid flow to swing the swing components and the payload carried by the tool and to maintain a constant speed of motion of the swing components while a machine operator is commanding the machine to move the boom member, the stick member, and the tool in a direction of decreasing slope.

Additionally, the swing motion actuation and control system 500 may command an offset in the pump displacement over center and in an opposite direction from a pump displacement resulting from a swing command implemented by the operator. The commanded offsets may be implemented when the machine is positioned on a slope, when digging is performed at a higher point in the direction of gravity on the slope, the boom member, the stick member, and the tool, and/or when the carried payload swings from the higher point to a lower point in the direction of gravity. The swing actuation and control system 500 may automatically decrease pump displacement to a relatively smaller pump displacement when the sensed inertial mass of the swing components and/or the payload is relatively less compared to a situation when the sensed inertial mass of the swing components and/or the payload is relatively greater. In some implementations, the swing motion actuation and control system 500 may automatically decrease pump displacement to a relatively smaller pump displacement even with an increase in the slope on which the machine operates if the inertial mass being moved is relatively smaller by a sufficient amount to counteract the gravitational effects caused by a relatively greater slope. The swing motion actuation and control system 500 may determine that an amount of hydrostatic pump displacement and a resulting swing flow provided to the hydraulic motors 404 and 406 are equivalent for moving a larger inertial mass on a smaller slope as for moving a smaller inertial mass on a larger slope.

The swing motion actuation and control system 500 may determine the amount of offset to a desired hydrostatic pump displacement based on one or more inputs and/or one or more factors (e.g., a magnitude of the inertial mass of the swing components and the carried payload, a roll rate, a yaw rate, and/or a pitch rate of the machine. For example, as the inertial mass being swung by the machine increases, the amount of offset to a desired hydrostatic pump displacement may also be proportionally increased, and as the inertial mass being swung by the machine decreases, the amount of offset to a desired hydrostatic pump displacement may be proportionally decreased.

As another example, as the roll rate, the yaw rate, and/or the pitch rate of the machine increases, the amount of offset to a desired hydrostatic pump displacement may also be proportionally increased. As the same factors decreases, the amount of offset to a desired hydrostatic pump displacement may be decreased. In some implementations, a pre-position scale (e.g., between a range of 0 to 1) may be used for additional compensation to pump displacement designed to smooth the effects of swing engagement and brake disengagement when the machine operates on a slope.

As further shown in FIG. 5, the swing motion actuation and control system 500 may control a swing commanded control pressure (e.g., via a swing pump ePRV). The swing motion actuation and control system 500 may determine and implement offsets based on one or more inputs and/or factors (e.g., an operator input to force command 512, slope control 514, brake control 516, brake slope control 518, force to delta pressure 520, swing control pressure 522, and/or ePRV closed loop control 524, among other examples). The swing commanded control pressure output by hydrostatic pump 402 may be supplied to one or more hydraulic motors (e.g., the hydraulic motors 404 and 406 of the closed loop hydrostatic pressure system 400) with hydrostatic loop pressure sensors (e.g., the hydrostatic loop pressure sensors 414 and 416 of FIG. 4) providing feedback to enable the swing motion actuation and control system 500 to determine the swing control pressure 522 and adjust the ePRV closed loop control 524.

In some implementations, the brake slope control 518 may include braking logic that achieves braking by offsetting a current pump displacement by an amount needed to decelerate swing motion, or by or by commanding the pump in an opposite direction from a direction of swing rotation. An amount of braking offset may be increased as the slope on which the machine is operating increases, or as the amount of inertial mass of the swing components and the carried payload increases. An amount of braking offset may be decreased as the slope on which the machine is operating decreases, or as the amount of inertial mass of the swing components and payload decreases. In some implementations, the brake slope control 518 may scale an offset amount of pump displacement lower as the inertial mass decreases even as the slope increases because the gravitational effects of the slope are offset by the lower inertial mass. The brake slope control 518 may also be performed by commanding a pilot ePRV to a maximum value when the machine brakes.

The number and arrangement of devices shown in FIG. 5 are provided as an example. In practice, there may be additional devices, fewer devices, different devices, or differently arranged devices than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of the swing motion actuation and control system 500 may perform one or more functions described as being performed by another set of devices of the swing motion actuation and control system 500.

INDUSTRIAL APPLICABILITY

As noted above, the disclosed subject matter relates to energy recovery prevention for a system 300. Generally, during operation of the system 300 in an energy recovery mode, a net negative torque is applied to an electric motor causing the electric motor to convert a mechanical input to an electrical input and provide the electrical input to the power source. The system 300 may cause, during the time that the system 300 operates in the energy recovery mode, application of an energy recovery prevention torque to the system 300 (e.g., via one or more bypass valves and/or hydraulic circuits, among other examples). The energy recovery prevention torque prevents the electric motor from converting the mechanical input to the electrical input and providing the electrical input to the power source.

Figure 6:
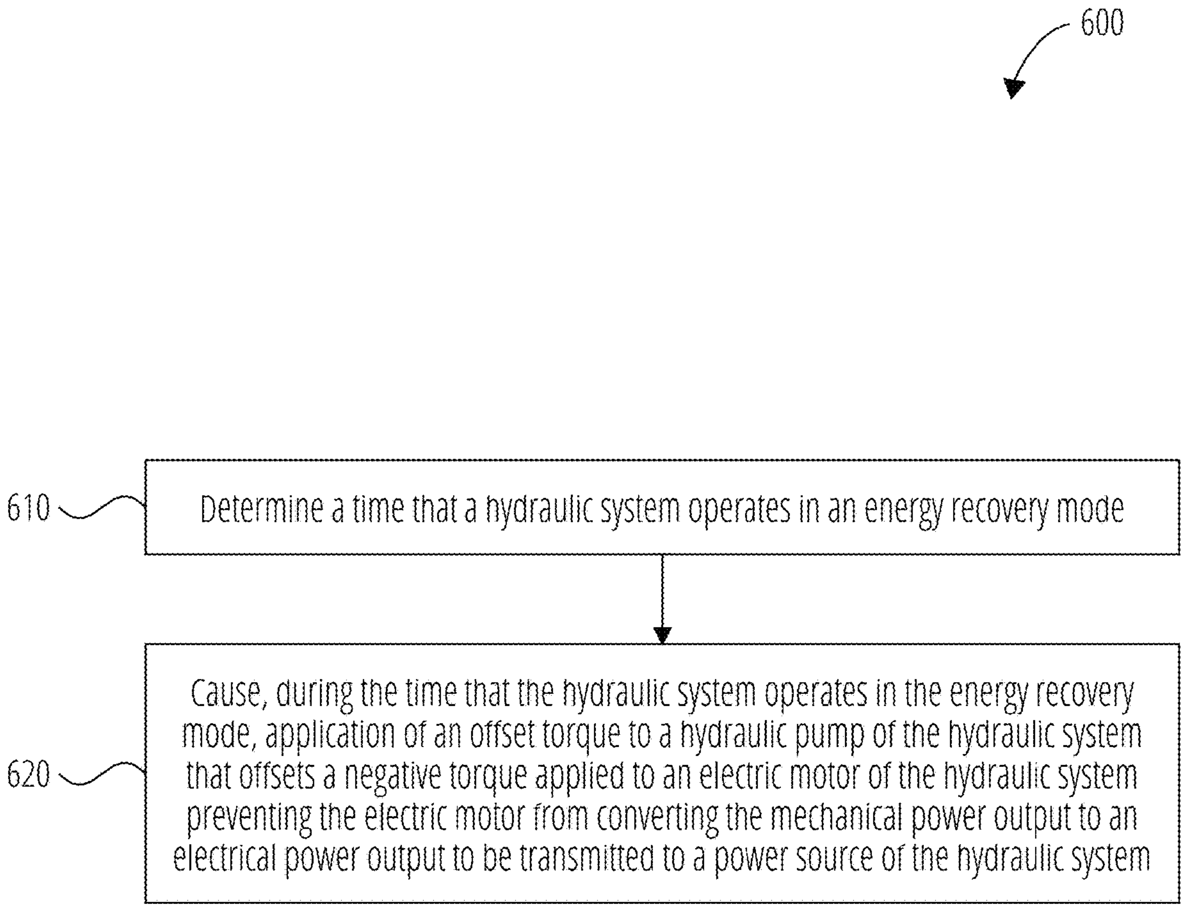
FIG. 6 is a flowchart of an example process associated with energy recovery prevention for a hydraulic system, in accordance with some embodiments of the present disclosure.

FIG. 6 is a flowchart of an example process 600 associated with energy recovery prevention for a hydraulic system. In some implementations, one or more process blocks of FIG. 6 may be performed by a controller of a hydraulic system. In some implementations, one or more process blocks of FIG. 6 may be performed by another device or a group of devices separate from or including the controller, such as one or more components of the hydraulic system and/or a machine equipped with the hydraulic system, as described in more detail elsewhere herein.

As shown in FIG. 6, the process 600 may include determining a time that a hydraulic system operates in an energy recovery mode (block 610). For example, a controller of the hydraulic system may determine the time that a hydraulic system operates in the energy recovery mode (e.g., which may correspond to a time that the net torque applied to an electric motor of the hydraulic system is a net negative torque value), as described in more detail elsewhere herein. During operation of the hydraulic system in the energy recovery mode, a net negative torque is applied to the electric motor causing the electric motor to convert a mechanical input to an electrical input and provide the electrical input to the power source.

As further shown in FIG. 6, the process 600 may include cause, during the time that the hydraulic system operates in the energy recovery mode, application of an energy recovery prevention torque to the hydraulic system (block 620). The energy recovery prevention torque prevents the electric motor from converting the mechanical input to the electrical input and providing the electrical input to the power source.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Embodiments of the disclosed subject matter can also be as set forth according to the following parentheticals.

(1) A machine, comprising: a hydraulic system that is operable in an energy recovery mode; an electric motor; a power source electrically coupled to the electric motor, wherein, during operation of the hydraulic system in the energy recovery mode, a net negative torque is applied to the electric motor causing the electric motor to convert a mechanical input to an electrical input and provide the electrical input to the power source; and a controller configured to: determine a time that the hydraulic system operates in the energy recovery mode; and cause, during the time that the hydraulic system operates in the energy recovery mode, application of an energy recovery prevention torque to the hydraulic system, wherein the energy recovery prevention torque prevents the electric motor from converting the mechanical input to the electrical input and providing the electrical input to the power source.

(2) The machine according to (1), wherein the time that the hydraulic system operates in the energy recovery mode is an energy recovery period triggered by initiation of an energy recovery event.

(3) The machine according to any one of (1) to (2), wherein the hydraulic system includes one or more bypass valves, and wherein the energy recovery prevention torque is applied to the hydraulic system via the one or more bypass valves.

(4) The machine according to any one of (1) to (3), wherein the energy recovery prevention torque is based on a feed forward command.

(5) The machine according to any one of (1) to (4), wherein the power source is at least one of: a battery equipped on the machine, or an external power source that is tethered to the machine.

(6) The machine according to any one of (1) to (5), wherein the net negative torque is a swing/implement regenerative braking torque.

(7) The machine according to any one of (1) to (6), wherein the time that the hydraulic system operates in the energy recovery mode is indicated by at least one of: sensor data associated with the hydraulic system, or command inputs associated with the hydraulic system.

(8) A method for controlling a hydraulic system driven by an electric motor electrically coupled to a power source, the method comprising: determining, by a controller of the hydraulic system, a time that the hydraulic system operates in an energy recovery mode, wherein, during operation of the hydraulic system in the energy recovery mode, a net negative torque is applied to the electric motor causing the electric motor to convert a mechanical input to an electrical input and provide the electrical input to the power source; and causing, by the controller and during the time that the hydraulic system operates in the energy recovery mode, application of an energy recovery prevention torque to the hydraulic system, wherein the energy recovery prevention torque prevents the electric motor from converting the mechanical power input to the electrical power output and providing the electrical input to the power source.

(9) The method according to (8), wherein the time that the hydraulic system operates in the energy recovery mode is a period that occurs later in time than a current time.

(10) The method according to anyone of (8) to (9), wherein the hydraulic system includes one or more bypass valves, and wherein the energy recovery prevention torque is applied to the hydraulic system via the one or more bypass valves.

(11) The method according to any one of (8) to (10), wherein the net negative torque is associated with an operation of an implement of the hydraulic system.

(12) The method according to any one of (8) to (11), further comprising: receiving, by the controller, at least one of a command input or a sensor input that indicates the time that the hydraulic system operates in the energy recovery mode.

(13) The method according to any one of (8) to (12), wherein the time that the hydraulic system operates in the energy recovery mode initiates after an energy recovery condition is satisfied.

(14) The method according to any one of (8) to (13), wherein the net negative torque decreases in magnitude during the time that the hydraulic system operates in the energy recovery mode.

(15) A hydraulic system, comprising: an electric motor; a power source electrically coupled to the electric motor, wherein, during operation of the hydraulic system in an energy recovery mode, a net negative torque is applied to the electric motor causing the electric motor to convert a mechanical power output to an electrical input and provide the electrical input to the power source; and a controller configured to: determine a time that the hydraulic system operates in the energy recovery mode; and cause, during the time that the hydraulic system operates in the energy recovery mode, application of an energy recovery prevention torque to the hydraulic system, wherein the energy recovery prevention torque prevents the electric motor from converting the mechanical power output to the electrical input and providing the electrical input to the power source.

(16) The hydraulic system according to (15), wherein the time that the hydraulic system operates in the energy recovery mode is an energy recovery period triggered by satisfaction of an energy recovery condition.

(17) The hydraulic system according to any one of (15) to (16), further comprising: one or more bypass valves, wherein the energy recovery prevention torque is applied to the hydraulic system via the one or more bypass valves.

(18) The hydraulic system according to any one of (15) to (17), wherein the energy recovery prevention torque is based on a feed forward command.

(19) The hydraulic system according to any one of (15) to (18), wherein the power source is at least one of: a battery equipped on a machine, or an external power source that is tethered to the machine.

(20) The hydraulic system according to any one of (15) to (19), wherein the net negative torque is a swing/implement regenerative braking torque.

As used herein, the term “component” is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known “opt-in” or “opt-out” processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to “at least one of” a list of items refers to any combination of those items, including single members. As an example, “at least one of: a, b, or c” is intended to cover a, b, c, a-b, a-c, b-c, and a-b-c, as well as any combination with multiple of the same item.

When “a processor” or “one or more processors” (or another device or component, such as “a controller” or “one or more controllers”) is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of “first processor” and “second processor” or other language that differentiates processors in the claims), this language is Intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form “one or more processors configured to: perform X; perform Y; and perform Z,” that claim should be interpreted to mean “one or more processors configured to perform X; one or more (possibly different) processors configured to perform Y; and one or more (also possibly different) processors configured to perform Z.”

No element, act, or instruction used herein should be construed as critical or essential unless explicitly described as such. Also, as used herein, the articles “a” and “an” are intended to include one or more items, and may be used interchangeably with “one or more.” Further, as used herein, the article “the” is intended to include one or more items referenced in connection with the article “the” and may be used interchangeably with “the one or more.” Furthermore, as used herein, the term “set” is intended to include one or more items (e.g., related items, unrelated items, or a combination of related and unrelated items), and may be used interchangeably with “one or more.” Where only one item is intended, the phrase “only one” or similar language is used. Also, as used herein, the terms “has,” “have,” “having,” or the like are intended to be open-ended terms. Further, the phrase “based on” is intended to mean “based, at least in part, on” unless explicitly stated otherwise. Also, as used herein, the term “or” is intended to be inclusive when used in a series and may be used interchangeably with “and/or,” unless explicitly stated otherwise (e.g., if used in combination with “either” or “only one of”).

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. An electrically powered machine, comprising:

a hydraulic system that is operable in an energy recovery mode and that includes a plurality of hydraulic pumps and one or more bypass valves;

an electric motor operatively coupled to drive each of the plurality of hydraulic pumps;

a power source electrically coupled to the electric motor; and a controller configured to:

determine a time that the hydraulic system operates in the energy recovery model, determine whether a net negative torque results from a summation of hydraulic pump loads for all of the plurality of hydraulic pumps driven by the electric motor, and cause, during the time that the hydraulic system operates in the energy recovery mode, and responsive to the summation of hydraulic pump loads resulting in the net negative torque, application of an energy recovery prevention torque to the hydraulic system, wherein the energy recovery prevention torque prevents the electric motor from converting the mechanical input to the electrical input and providing the electrical input to the power source under a condition where the net negative torque otherwise would be applied to the electric motor to cause the electric motor to convert a mechanical input to an electrical input and provide the electrical input to the power source, and wherein the energy recovery prevention torque is applied to the hydraulic system via the one or more bypass valves.

2. The machine of claim 1, wherein the time that the hydraulic system operates in the energy recovery mode is an energy recovery period triggered by initiation of an energy recovery event.

3. The machine of claim 1, wherein the energy recovery prevention torque is based on a feed forward command.

4. The machine of claim 1, wherein the power source is at least one of:

a battery equipped on the machine, or an external power source that is tethered to the machine.

5. The machine of claim 1, wherein the net negative torque is a swing/implement regenerative braking torque.

6. The machine of claim 1, wherein the time that the hydraulic system operates in the energy recovery mode is indicated by at least one of:

sensor data associated with the hydraulic system, or command inputs associated with the hydraulic system.

7. A method for controlling a hydraulic system driven by an electric motor electrically coupled to a power source, the method comprising:

determining, by a controller, a time that the hydraulic system operates in an energy recovery mode;

determining, by the controller, whether a net negative torque is anticipated to result based on a summation of hydraulic pump loads for all of a plurality of hydraulic pumps driven by the electric motor; and causing, by the controller, during the time that the hydraulic system operates in the energy recovery mode and responsive to the summation of hydraulic pump loads anticipated to result in the net negative torque, application of an energy recovery prevention torque to the hydraulic system, wherein the energy recovery prevention torque prevents the electric motor from converting the mechanical power input to the electrical power output and providing the electrical input to the power source under a condition where the net negative torque otherwise would be applied to the electric motor to cause the electric motor to convert a mechanical input to an electrical input and provide the electrical input to the power source.

8. The method of claim 7, wherein the hydraulic system includes one or more bypass valves, and wherein the energy recovery prevention torque is applied to the hydraulic system via the one or more bypass valves.

9. The method of claim 7, wherein the net negative torque is associated with an operation of an implement of the hydraulic system.

10. The method of claim 7, further comprising:

receiving, by the controller, at least one of a command input or a sensor input that indicates the time that the hydraulic system operates in the energy recovery mode.

11. The method of claim 7, wherein the time that the hydraulic system operates in the energy recovery mode initiates after an energy recovery condition is satisfied.

12. The method of claim 7, wherein the net negative torque decreases in magnitude during the time that the hydraulic system operates in the energy recovery mode.

13. A hydraulic system, comprising:

a plurality of hydraulic pumps:

an electric motor to drive each of the plurality of hydraulic pumps;

a power source electrically coupled to the electric motor; and a controller configured to:

determine a time that the hydraulic system operates in the energy recovery mode;

determine, in real time, whether a net negative torque is anticipated to result based on a summation of hydraulic pump loads for all of a plurality of hydraulic pumps driven by the electric motor; and cause, during the time that the hydraulic system operates in the energy recovery mode, and responsive to the summation of hydraulic pump loads resulting in the net negative torque, application of an energy recovery prevention torque to the hydraulic system, wherein the energy recovery prevention torque prevents the electric motor from converting the mechanical power output to the electrical input and providing the electrical input to the power source under a condition where the net negative torque otherwise would be applied to the electric motor to cause the electric motor to convert a mechanical input to an electrical input and provide the electrical input to the power source.

14. The hydraulic system of claim 13, wherein the time that the hydraulic system operates in the energy recovery mode is an energy recovery period triggered by satisfaction of an energy recovery condition.

15. The hydraulic system of claim 13, further comprising:

one or more bypass valves, wherein the energy recovery prevention torque is applied to the hydraulic system via the one or more bypass valves.

16. The hydraulic system of claim 13, wherein the energy recovery prevention torque is based on a feed forward command.

17. The hydraulic system of claim 13, wherein the power source is at least one of:

a battery equipped on a machine, or an external power source that is tethered to the machine.

18. The hydraulic system of claim 13, wherein the net negative torque is a swing/implement regenerative braking torque.

* * * * *